July 30, 1968  A. JOTZOFF  3,394,981

KINEMATOGRAPHIC APPARATUS WITH A ROTARY MIRROR-CARRYING SHUTTER

Filed Oct. 18, 1965

INVENTOR

ANGELO JOTZOFF

BY Emery L. Groff

ATTORNEY

United States Patent Office 3,394,981
Patented July 30, 1968

3,394,981
KINEMATOGRAPHIC APPARATUS WITH A ROTARY MIRROR-CARRYING SHUTTER
Angelo Jotzoff, Bubenreuth, Germany, assignor to Paillard S.A., Sainte-Croix, Vaud, Switzerland, a corporation of Switzerland
Filed Oct. 18, 1965, Ser. No. 496,748
Claims priority, application Switzerland, May 11, 1965, 6,537/65
11 Claims. (Cl. 352—206)

ABSTRACT OF THE DISCLOSURE

A kinematographic apparatus in which a mirror-carrying rotary shutter is rigidly mounted on a motor driven shaft which is obliquely disposed relative to the plane of the film. A film driving claw is also mounted on the same motor driven shaft as the shutter, thus eliminating the necessity of a second shaft and means for connecting the two shafts together.

---

In order to reduce the noise and the clearance between the gears in kinematographic apparatus, it is of advantage, as well known in the art, to fit on a same shaft a rotary shutter and the claw driving cams. It is also known in the art to directly couple said shaft with the electric motor which is to drive it.

My invention has for its object a development of such a structure which I apply to kinematographic apparatus provided with a mirror-carrying rotary shutter. Hitherto, such apparatus required the use of separate shafts for the driving of the shutter and of the claw respectively. The two shafts were positively coupled by means of gears and connected together with the shaft of the driving motor.

My invention has for its object a kinematographic apparatus provided with a rotary mirror-carrying shutter. According to my invention, the shutter is given the general shape of a flat disc fitted on a shaft oblique with reference to the film plane in the film gate, which shaft carries means for driving the film-engaging claw operating in a plane parallel with that of the shutter.

I have illustrated diagrammatically and by way of example in the accompanying drawing a preferred embodiment of the improved apparatus. In said drawing:

FIG. 2 shows on a larger scale a portion of the film with the claw engaging a perforation thereof.

FIG. 3 shows a succession of cross-sections of the claw.

FIG. 4 is an end elevation of the claw shown in FIGURE 1, with the rotary member removed.

Figure 1:
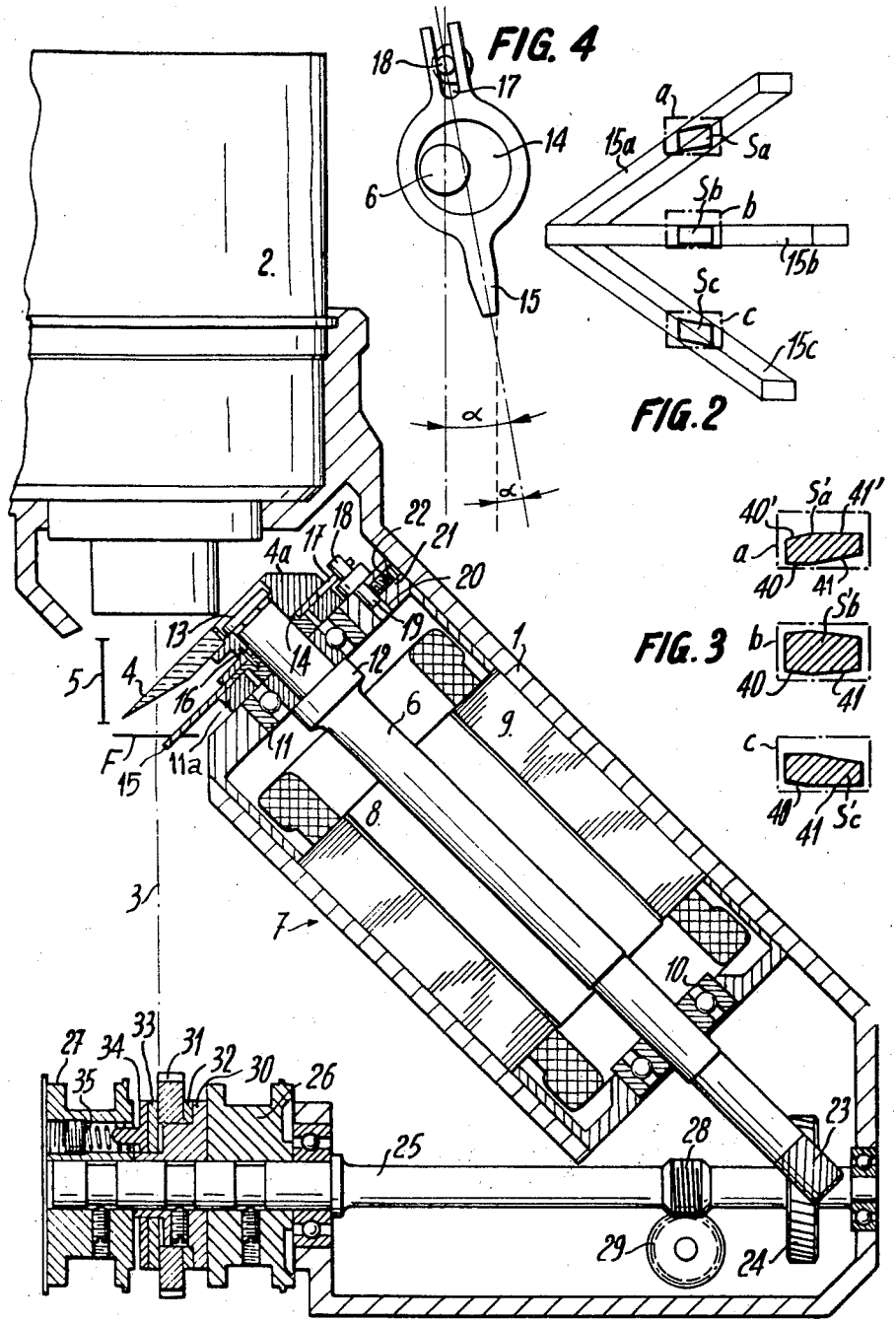
FIG. 1 is a diagrammatic sectional view of the apparatus.

As shown in FIG. 1, the apparatus illustrated in horizontal cross-sectional view includes a casing 1 of which a section carries an objective 2 of which the optical axis is designated by the reference number 3. The film F is illustrated diagrammatically as positioned in the film gate which has not been drawn so as to avoid an overloading of the drawing.

The luminous rays are cut off between the objective 2 and the film F by a rotary mirror-carrying shutter 4, the shutter mirror reflecting when the shutter is in its closing position the image formed by the objective 2 as well-known in the art in a direction perpendicular to the optical axis 3 into a view finder focusing system illustrated symbolically by the simple line 5.

The mirror 4 carried by the shutter is secured to a rotary member 4a secured in its turn to the end of the shaft 6 controlled by the electric motor 7 which includes conventionally a rotor 8, a stator 9 and ball bearings 10 and 11.

The shaft 6 is provided with a shoulder 12 in contact with which a screw 13 clamps the inner race of the bearing 11, an eccentric member 14 actuating a claw 15 adapted to drive the film forwardly and the above-mentioned member 4a forming part of the shutter. The angular setting between the eccentric member 14 and the member 4a forming part of the shutter is maintained at a constant value by a pin 16 fitted in bores provided in both last-mentioned parts.

The claw 15 is provided with a central port fitted over the eccentric member 14 and with a slot 17 which allows said claw to slide and pivot round the stud 18 mounted eccentrically over a pivot 19 carried inside a port 20 formed in a part 21 rigid with the motor 7. The pivot 19 may be secured in position by means of a locking screw 22.

The claw 15 is guided laterally by two bearing surfaces between which it extends. One of said surfaces is formed by one side of the rotary member 4a forming part of the mirror-carrying shutter 4 while the other surface is constituted by one side of the member 11a covering the bearing 11.

The claw 15 executes under the action of the eccentric member 14 a reciprocatory pivotal movement round the stud 18 together with a sliding movement which ensures its engagement with a film perforation followed by a receding movement with reference to said perforation. The reciprocation of the claw is symmetrical with reference to a plane passing through the optical axis 3 and the axis of the shaft 6 of the electric motor 7. Since the latter forms an angle of 45° with reference to the optical axis 3, the claw 15 also moves in a plane forming an angle of 45° with the plane of the film F in its channel. An adjustment of the claw path may be executed by modifying the location of the eccentric stud 18 through a rotary movement of its support 19.

FIG. 2 illustrates in a highly diagrammatic manner a number of positions to be assumed by the claw 15, which positions have been designated respectively by 15a for the upper outer position of the claw, by 15b for its medial position for which the claw lies in the plane defined by the motor shaft axis and the optical axis and by 15c for its extreme lower position. These three positions of the claw correspond to the movement leading to a shifting of the film by one picture. The three corresponding positions of the film perforation engaged by the claw during said movement are designated by a, b, c. Furthermore, there is illustrated at Sa, Sb, Sc the section of the claw engaging the perforation and lying in the film plane. This shows that in the case of a claw having a rectangular cross-section, the contract between the claw and the edge of a perforation is not obtained throughout the length of the perforation edge except for the medial position 15b of the claw. When the claw moves away from said medial position in either direction, it no longer bears on the perforation except through a ridge of the claw, which ensures in practice a punctual contact between said claw and the perforation edge.

Such an arrangement would lead to very high specific pressures which might speedily damage the film.

To cut out this drawback, it is of advantage to design in a special manner the surfaces of the claw which cooperate with the perforation.

FIG. 3 illustrates the cross-sections Sa', Sb', Sc' of a claw the shape of which has been corrected so as to obtain a proper engagement of the claw with the edge of each perforation. It is apparent that at the moment of the engagement with a perforation lying in the position a, the claw engages the perforation edge through an elementary surface 40 parallel with the perforation edge. As it passes into the medial position b for which the stresses exerted on the film are greatly reduced when compared with the stresses during the first engagement of the claw, said claw engages the perforation edge through the very obtuse ridge formed by the intersection of its two elementary surfaces 40 and 41.

At the end of the film progression and when the perforation occupies the position c, the claw engages the perforation edge through the elementary surface 41 which is practically parallel with the edge of said perforation. It should be remarked that the elementary surface 41 is broader than the elementary surface 40 and this is of advantage for properly holding the film in a stationary position as provided by a suitable uniformity in the location of the perforation with reference to the objective after each stepwise progression.

In order that the disengagement of the claw may be performed under the best conditions possible, it is also necessary for the elementary surface 41 to be perpendicular to the film plane during said receding movement of the claw. This result is achieved by giving said surface 41 a position forming an angle α with reference to the longitudinal axis of the claw, which angle is equal to the angular shifting of the claw between its medial position and the position for which it disengages the perforation, as illustrated in FIG. 4.

In principle, said angle α is also equal to the angle formed by the claw with a perpendicular to the film plane at the moment of the engagement of a perforation by the claw and it is of advantage for the elementary surface 40 to also form an angle equal to α with the longitudinal axis of the claw.

Since the claw 15 has to ensure the film drive during its forward progression and during its rearward progression, the elementary surfaces 40 and 41 have symmetrical replicas designated by the reference numbers 40' and 41' on the opposite side of the claw. The elementary surfaces 40 and 41 are flat and consequently their machining is an easy matter. However, if it is desired to obtain a maximum length of engagement with the perforation edge throughout the duration of the drive, it is possible to replace such flat elementary surfaces 40 and 41 by ruled surfaces ensuring a linear contact with a fraction of the perforation edge throughout the engagement and disengagement movement of the claw with reference to a perforation.

The drive of the feed and take up spools of the film is obviously controlled by the electric motor 7. To this end, the rear end of the shaft 6 is provided with a worm 23 meshing with a wormwheel 24 rigid with a shaft 25 carrying at its end the two feed spools 26 and 27. Said shaft 25 carries a further worm 28 driving a further wormwheel 29 operatively connected with a metering instrument showing the length of the film which has been exposed.

The feed spools 26 and 27 are separated from each other by a member 30 acting as a hub for a toothed wheel 31 meshing with a gearing adapted to drive the take up spool for the film. Said toothed wheel 31 may revolve freely over the hub 30 but its lateral walls are clamped between two friction washers 32 and 33. The washer 33 is carried by a member 34 subjected to the action of a plurality of springs carried inside the feed spool 27 and of which only one, 35, has been illustrated. There is thus obtained a frictional drive under constant torque conditions, which allows, as well known per se, a compensation between the variations in rotary speed of the hub carrying the take up spool which appear by reason of the modifications in the amount of film wound over last-mentioned spool.

What I claim is:

1. In a kinematographic apparatus, the combination of a film guiding channel, an objective the optical axis of which is perpendicular to the plane of said channel, a rotary shaft extending obliquely with reference to the film in said channel, a flat disc-shaped mirror-carrying shutter rigid with the shaft at a point adjacent the film channel, a claw operatively connected with the shaft to be reciprocated in a plane parallel with the shutter to thereby engage and disengage the film perforations.

2. In a kinematographic apparatus, the combination of a film guiding channel, an objective the optical axis of which is perpendicular to the plane of said channel, an electric motor including a rotor, a stator and a rotary shaft extending obliquely with reference to the film in said channel, a flat disc-shaped mirror-carrying shutter rigid with the shaft at a point adjacent the film channel, a claw operatively connected with the shaft to be reciprocated in a plane parallel with the shutter to thereby engage and disengage the film perforations, and film-driving means controlled by the motor shaft through the end thereof facing away from the shutter.

3. In a kinematographic apparatus, the combination of a film-guiding channel, an objective the optical axis of which is perpendicular to the plane of said channel, a rotary shaft extending at an angle of 45° with reference to the film in said channel, a flat disc-shaped mirror-carrying shutter rigid with the shaft at a point adjacent the film channel, a claw operatively connected with the shaft to be reciprocated in a plane parallel with the shutter to thereby engage and disengage the film perforations.

4. In a kinematographic apparatus, the combination of a film-guiding channel, an objective the optical axis of which is perpendicular to the plane of said channel, a rotary shaft extending obliquely with reference to the film in said channel, a flat disc-shaped mirror-carrying shutter rigid with the shaft at a point adjacent the film channel, a claw adapted to be reciprocated in a plane parallel with the shutter between extreme positions and an eccentric member rigid with the shaft and controlling the reciprocation of the claw to either side of the plane defined by the objective axis and the shaft axis.

5. In a kinematographic apparatus, the combination of a film-guiding channel, an objective the optical axis of which is perpendicular to the plane of said channel, an electric motor including a rotor, a stator and a rotary shaft extending obliquely with reference to the film in said channel, a flat disc-shaped mirror-carrying shutter rigid with the shaft at a point adjacent the film channel, a claw adapted to be reciprocated in a plane parallel with the shutter between extreme positions symmetrically located to either side of the plane defined by the optical axis of the objective and by the shaft axis, and adjustable stationary means engaging the claw and adapted to define the extent of engagement of the claw with the film perforations during its reciprocation.

6. In a kinematographic apparatus, the combination of a film guiding channel, an objective the optical axis of which is perpendicular to the plane of said channel, an electric motor including a rotor, a stator and a rotary shaft extending obliquely with reference to the film in said channel, a flat disc-shaped mirror-carrying shutter rigid with the shaft at a point adjacent the film channel, a claw to be reciprocated in a plane parallel with the shutter to thereby engage and disengage the film perforation located to either side of the plane defined by the optical axis of the objective and by the shaft axis, a pivot rigid with the rotor stator and parallel with the shaft axis, a stud eccentrically and adjustably carried by said pivot and engaging the claw through a slot and pin connection.

7. In a kinematographic apparatus as claimed in claim 4, the provision of two sprocket wheels adapted to engage the film on either side of the film guiding channel, means frictionally engaging the surfaces of said wheels facing each other and controlled in unison with the rotary shaft, a take up spool controlled by said friction means.

8. In a kinematographic apparatus as claimed in claim 4, the provision of a claw the opposite operative surfaces of which engaging the film perforations include each two elementary surfaces engaging the edge of the perforation facing them in linear contacting relationship respectively during the entrance of the claw into the perforation and during its releasing movement with reference to the latter.

9. In a kinematographic apparatus as claimed in claim 4, the provision of a claw the opposite operative surfaces of which engaging the film perforations include each two elementary flat surfaces engaging the edge of the perforation facing them in linear contacting relationship respectively during the entrance of the claw into the perforation and during its releasing movement with reference to the latter.

10. In a kinematographic apparatus as claimed in claim 4, the provision of a claw the opposite surfaces of which engaging the film perforations form ruled surfaces ensuring each a permanent linear contact between the claw surface and the cooperating edge during the film drive in the forward and rearward directions respectively.

11. In a kinematographic apparatus as claimed in claim 4, the provision of a claw the opposite operative surfaces of which engaging the film perforations include each two elementary surfaces engaging the edge of the perforation facing them in linear contacting relationship respectively during the entrance of the claw into the perforation and during its releasing movement with reference to the latter, said elementary surfaces forming with the longitudinal axis of the claw an angle equal to that defined between said plane and one extreme position of the claw.

References Cited

UNITED STATES PATENTS 2,551,085   5/1951   Bach.

FOREIGN PATENTS 1,318,665   1/1963   France.
126,682   2/1932   Germany.
942,961   5/1956   Germany.
130,452   2/1929   Switzerland.

NORTON ANSHER, *Primary Examiner.*

M. H. HAYES, *Assistant Examiner.*